(12) United States Patent
Jang et al.

(10) Patent No.: US 10,875,786 B2
(45) Date of Patent: Dec. 29, 2020

(54) WATER PURIFIER

(71) Applicant: LG Electronics Inc., Seoul (KR)

(72) Inventors: Munjae Jang, Seoul (KR); Seungdon Lee, Seoul (KR); Bonghee Won, Seoul (KR); Chetan Sorab, Seoul (KR); Kunal Shah, Seoul (KR); Rajesh Karedla, Seoul (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 16/242,128

(22) Filed: Jan. 8, 2019

(65) Prior Publication Data

US 2019/0218109 A1 Jul. 18, 2019

(30) Foreign Application Priority Data

Jan. 15, 2018 (KR) .................. 10-2018-0005242

(51) Int. Cl.
*B01D 61/36* (2006.01)
*C02F 1/00* (2006.01)
(Continued)

(52) U.S. Cl.
CPC ............ *C02F 1/003* (2013.01); *B01D 61/364* (2013.01); *C02F 9/005* (2013.01); *B01D 3/42* (2013.01); *B01D 61/025* (2013.01); *B01D 2311/2649* (2013.01); *B01D 2313/12* (2013.01); *C02F 1/283* (2013.01); *C02F 1/441* (2013.01); *C02F 2201/005* (2013.01); *C02F 2201/006* (2013.01);
(Continued)

(58) Field of Classification Search
CPC ...... C02F 1/003; C02F 9/005; C02F 2307/10; C02F 2201/005; C02F 2201/006; C02F 1/283; C02F 1/441; C02F 2201/007; C02F 2209/445; C02F 2101/20; C02F 2201/002; C02F 2301/08; C02F 1/001; B01D 61/364; B01D 2313/12; B01D 61/025; B01D 2311/2649; B01D 3/42

USPC ...... 210/450, 542, 449; 220/592.02; 62/188, 62/3.6

See application file for complete search history.

(56) References Cited

U.S. PATENT DOCUMENTS 3,430,769 A * 3/1969 Sanzenbacher ......... C02F 1/003
210/266

FOREIGN PATENT DOCUMENTS

JP 2008-168237 7/2008
KR 10-1997-007202 A 2/1997
(Continued)

OTHER PUBLICATIONS

English Machine Translation of Yong et al., KR20-0367974, Nov. 16, 2004.*

*Primary Examiner* — Madeline Gonzalez
(74) *Attorney, Agent, or Firm* — Finnegan, Henderson, Farabow, Garrett & Dunner LLP

(57) ABSTRACT

A water purifier includes a water purifier body including a housing and a filter provided in the housing to filter raw water introduced from outside of the water purifier body. A water discharge module including a water discharge nozzle is disposed on a front surface of the water purifier body to supply the water passing through the filter to the outside of the water purifier body. The water discharge module includes a case from which the water discharge nozzle extends at a lower end of the case. A protection cap is detachably coupled to the lower end of the case to cover at least a portion of the water discharge nozzle extending outside of the case.

20 Claims, 14 Drawing Sheets

(51) Int. Cl.
*C02F 9/00* (2006.01)
*B01D 3/42* (2006.01)
*C02F 1/44* (2006.01)
*C02F 1/28* (2006.01)
*B01D 61/02* (2006.01)

(52) U.S. Cl.
CPC .. *C02F 2201/007* (2013.01); *C02F 2209/445* (2013.01); *C02F 2307/10* (2013.01)

(56) References Cited

FOREIGN PATENT DOCUMENTS

| | | |
|---|---|---|
| KR | 20-0367974 | 11/2004 |
| KR | 10-2007-0115097 | 12/2007 |
| KR | 10-2010-0054580 | 5/2010 |
| KR | 10-1120358 B1 | 3/2012 |
| KR | 10-1178834 B1 | 9/2012 |
| KR | 20-2013-0001194 | 2/2013 |
| KR | 10-1308124 | 9/2013 |
| KR | 10-1338670 | 12/2013 |
| KR | 10-1381803 | 3/2014 |
| KR | 10-2015-0004669 | 1/2015 |
| KR | 10-2015-0075214 | 7/2015 |

\* cited by examiner

WATER PURIFIER

CROSS-REFERENCE TO RELATED APPLICATIONS

The present application claims priority under 35 U.S.C. 119 and 35 U.S.C. 365 to Korean Patent Application No. 10-2018-0005242, filed on Jan. 15, 2018, which is hereby incorporated by reference in its entirety.

BACKGROUND

The present disclosure relates to a water purifier.

In general, water purifiers are being used for household purposes as mechanisms that filter water to remove impurities.

In detail, water purifiers are connected to a water supply system to remove floating matter or harmful components contained in tap water, and purify as much water as desired in accordance with a user's manipulation of a control on the water purifier to dispense the purified water.

As described above, water purifiers are being released in various products, which are capable of dispensing hot water and cold water as well as purified water. Also, in recent years, water purifiers with a small enough size for installation in various environments are being developed.

However, when such a water purifier is used in respective homes, institutions, or offices, bacteria on a user's hand and bacteria or dust floating in the air are attached to a water discharge nozzle, through which purified water, cold water, and hot water are selectively dispensed, thereby contaminating the water discharge nozzle.

Also, while water is dispensed through the water discharge nozzle to drink coffee or the like, impurities such as coffee come into contact with the water discharge nozzle to contaminate the water discharge nozzle. As a result, a large amount of bacteria may exist on the water discharge nozzle.

Also, flies, mosquitoes, and the like come into contact with the water discharge nozzle, and thus, the water discharge nozzle may be contaminated by various bacteria.

Thus, it is desirable to provide the water purifier with a cover unit for protecting the water discharge nozzle so as not to contaminate the water discharge nozzle.

In some water purifiers according to the related art, a lever that rotates in a forward and backward direction is provided below the water discharge nozzle for discharging purified water, cold water, or hot water, and when the user presses the lever backward with a cup or the like, or pulls the lever by hand, the water discharge nozzle is opened to discharge the purified water, the cold water, or the hot water, into a cup. A user may drink the purified water, the cold water, or the hot water, which is contained in the cup.

However, in the case of the water purifier according to the related art, in which the dispensing of the water is performed through the lever disposed below the water discharge nozzle as described above, if the user accidentally pushes the lever even slightly, the water discharge nozzle is immediately opened to suddenly dispense the purified water, the cold water, or the hot water.

Thus, it would be desirable to provide a water purifier in which the water discharge nozzle is not opened even though the lever rotates at a predetermined angle. Preferably, the water discharge nozzle is opened to dispense the water only when the user clearly intends to dispense water by rotating the lever by more than the predetermined angle.

When the lever returns to the lower side of the water discharge nozzle while the lever rotates forward or backward to dispense the purified water, and the dispensing of the water is ended, the lever comes into contact with the water dispensed from the water discharge nozzle. This contact with the lever may cause splashing of the water, and thus, contamination of the lever.

As described above, when the dispensed water comes into contact with the lever, the dispensed water touches the front surface of the water purifier or the user due to rotation force of the lever, and thus, the front surface or periphery of the product may be continuously contaminated.

As a result, the user's dissatisfaction increases when the water purifier is used, and sanitation limitations occur due to the contamination of the product.

SUMMARY

Embodiments provide a sanitary water purifier in which a periphery of a water discharge nozzle is covered by a protection cap to reduce the possibility of occurrence of contamination of the water discharge nozzle.

Embodiments also provide a water purifier that is capable of allowing a user to always receive clean water through a water discharge nozzle that is sanitary.

Embodiments also provide a water purifier in which a user is capable of recognizing a position of a water dispensing nozzle in a state in which the water discharge nozzle is covered by a protection cap.

Embodiments also provide a water purifier in which a protection cap is capable of being easily cleaned because the protection cap covering the water discharge nozzle is easily detachable.

Embodiments also provide a water purifier in which a water discharge nozzle is not opened even through a lever rotates at a predetermined angle, but the water discharge nozzle is opened to dispense water only when a user's water dispensing intention is clearly transmitted even if the lever rotates by the predetermined angle.

Embodiments also provide a water purifier in which when a lever rotates forward and backward, a water discharge nozzle is covered before the lever reaches a vertical lower side of the water discharge nozzle to end dispensing of water, and thus, the water discharged from the water discharge nozzle does not contact the lever to prevent the water from being splashed and to maintain the cleanliness of the lever.

Embodiments also provide a water purifier in which contamination of a lever is prevented as described above to improve sanitation and cleanliness of a user, thereby solving health hazards of the user due to the improvement of the sanitation and cleanliness.

Embodiments also provide a water purifier in which contamination of a front surface of a water purifier by dispensed purified water is prevented to improve sanitation and cleanliness of the water purifier itself due to the improvement of the sanitation and cleanliness.

Embodiments also provide a water purifier in which reliability of a product by a user is improved, and usage satisfaction by use of the product increases due to the improvement of the reliability of the product.

In one embodiment, a water purifier includes a water purifier body including a housing defining an outer appearance and configuration and a filter provided in the housing to filter raw water introduced from the outside. The water purifier also includes a water discharge module including a water discharge nozzle which is disposed on a front surface of the water purifier body to supply the water passing through the filter to the outside of the water purifier body.

The water discharge module includes a case from which the water discharge nozzle is exposed at a lower end of the case and which is coupled to the front surface of the water purifier body. A protection cap is detachably coupled to the lower end of the case to cover at least a portion of the water discharge nozzle exposed to the outside of the case.

The protection cap may have a container shape including an opened upper portion and a recess extending downward from the opened upper portion, and a water discharge hole may be defined in a bottom surface of the protection cap at a position corresponding to the water discharge nozzle.

The protection cap may be engaged with and detached from the lower end of the case. The protection cap may be slid in a backward direction (to the right in FIG. 4) for engagement with the case and in a forward direction (to the left in FIG. 4) for detachment from the lower end of the case. A through-groove through which the water discharge nozzle passes during sliding of the protection cap may be defined in a rear surface of the protection cap to provide clearance for the water discharge nozzle as the protection cap is engaged with and detached from the lower end of the case.

At least a portion of a lever that is disposed below the water discharge nozzle to rotate backward and forward so as to open and close the water discharge nozzle may be disposed below the water discharge hole.

The protection cap may be made of a transparent or translucent material.

The water discharge module may further include: a chamber provided in the case to provide a water inflow hole through which the water passing through the filter is introduced and an accommodation part in which the water introduced through the water inflow hole is accommodated and having a lower end communicating with an opened upper side of the water discharge nozzle; an opening/closing unit provided in the chamber to selectively open and close the opened upper side of the water discharge nozzle while being elevated above the water discharge nozzle; and a lever provided outside the case to allow the opening/closing unit to ascend while rotating forward and backward below the water discharge nozzle.

The lever may include: a pressing part disposed below the water discharge nozzle; a vertical part extending upward from each of both sides of the pressing part; a horizontal part extending from an end of the vertical part to the inside of the case; and a plate-shaped cam member disposed on an end of the horizontal part to convert a rotation motion generated in the horizontal part into a reciprocating motion and thereby to transmit the reciprocating motion to the opening/closing unit.

A cushion member made of an elastic material may be disposed on a lower end of the lever.

A front cover defining the front surface of the housing may have a lower portion that is recessed backward with respect to the water discharge module.

A friction member made of an elastic material to prevent the pressing part from being slid may be disposed on a front surface of the pressing part.

The opening/closing unit may include: an elevation cap disposed outside the chamber and elevated by the lever; and an opening/closing member disposed inside the chamber and connected to the elevation cap to selectively open and close the opened upper side of the water discharge nozzle while being elevated together with the elevation cap.

The opening/closing member may include: a first opening/closing member directly connected to the elevation cap; and a second opening/closing member disposed below the first opening/closing member and having a lower end that selectively opens and closes the opened upper side of the water discharge nozzle, wherein a first compression spring is inserted between the first opening/closing member and the second opening/closing member.

A hollow part may be defined in the first opening/closing member, and an upper portion of the second opening/closing member may be accommodated in the hollow part of the first opening/closing member.

A long hole communicating with the hollow part may be vertically defined in the first opening/closing member and closed at a lower end of the long hole by a portion of the hollow part, and a protrusion inserted into the long hole may be disposed on an outer surface of the second opening/closing member.

The long hole may have a length greater than that of the protrusion, and when the protrusion is hooked with the closed lower end of the long hole while the first opening/closing member ascends together with the elevation cap, the second opening/closing member may ascend also together with the first opening/closing member.

An upper end of the first opening/closing member passes through a top surface of the chamber and may be connected to the elevation cap, and a second compression spring may be inserted between the first opening/closing member and the top surface of the inside of the chamber.

When the lever rotates backward, a section in which the lever rotates may include: a first rotation section in which the second opening/closing member is maintained in the state of covering the upper side of the water discharge nozzle while only the elevation cap and the first opening/closing member ascend; and a second rotation section which is provided behind the first rotation section and in which the second opening/closing member opens the upper side of the water discharge nozzle while the elevation cap, the first opening/closing member, and the second opening/closing member ascend.

A purified water tank in which the water passing through the filter is stored may be installed in an upper portion of the inside of the housing, and the purified water tank may be connected to the chamber.

The chamber may include: a body part having an opened upper side, one side in which a water inflow hole through which the water passing through the filter is introduced, and a lower side to which the water discharge nozzle is connected; and a plug part covering the opened upper side of the body part.

At least one of a display unit displaying various information and an input unit receiving various information may be disposed on a front surface of the case that is exposed to the outside of the housing.

The details of one or more embodiments are set forth in the accompanying drawings and the description below. Other features will be apparent from the description and drawings, and from the claims.

DETAILED DESCRIPTION OF THE EMBODIMENTS

Figure 1:
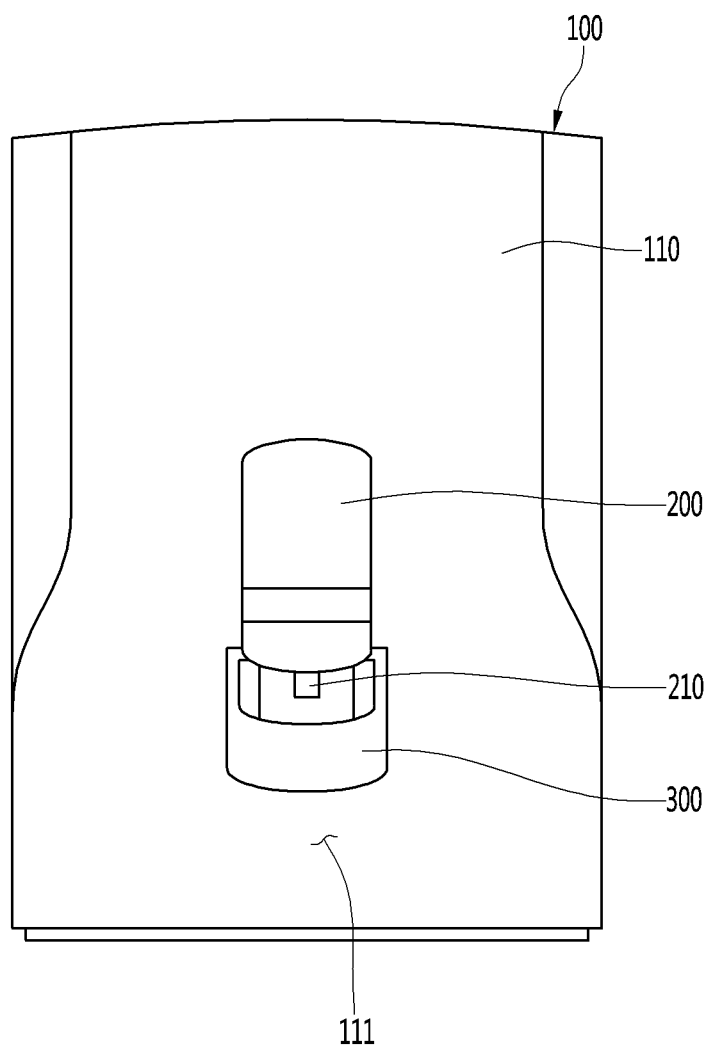
FIG. 1 is a front view of a water purifier according to an embodiment.

Hereinafter, a structure of a water purifier according to an embodiment will be described in more detail. The same reference numerals are used for the same constituent elements throughout the drawings.

In the following description of the present disclosure, a detailed description of known functions and configurations incorporated herein will be omitted to avoid making the subject matter of the present disclosure unclear.

In describing the components of the embodiment of the present disclosure, terms such as first and second or A and B or (a) and (b) may be used, but it is to be understood that the terms are not intended to limit the nature, order, or sequence of constituent elements.

When it is described that an element is "coupled to", "engaged with", or "connected to" another element, it should be understood that the element may be directly coupled or connected to the other element but still another element may be "coupled to", "engaged with", or "connected to" the other element between them.

Figure 2:
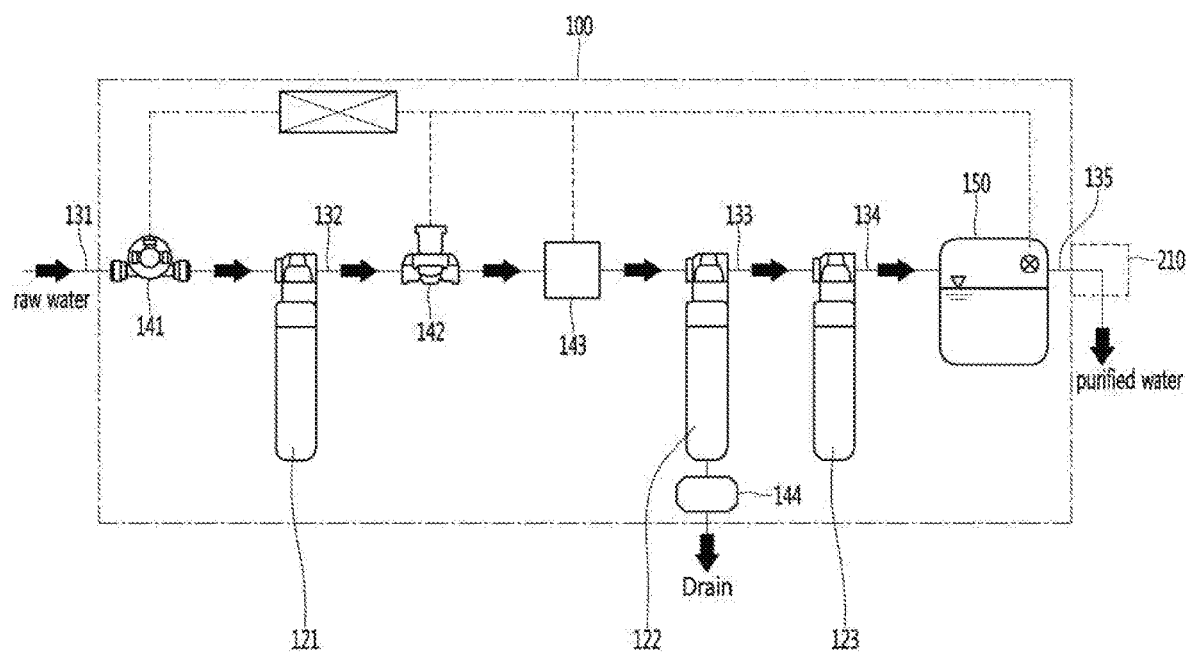
FIG. 2 is a view illustrating a water tube of the water purifier according to an embodiment.

FIG. 1 is a front view of a water purifier according to an embodiment. FIG. 2 is a view illustrating a water tube of the water purifier according to an embodiment.

Referring to FIGS. 1 and 2, a water purifier 10 according to an embodiment includes a water purifier body 100 and a water discharge module 200 provided with a water discharge nozzle 210 supplying water purified in the water purifier body 100 to the outside.

The water purifier body 100 includes a housing 110 defining an outer appearance and configuration of the water purifier body 100 and filter members 121, 122, and 123 installed in the housing 110 to filter raw water introduced from the outside.

As described above, the raw water is supplied to the filter members 121, 122, and 123 via a raw water tube, and then, the water (the purified water) purified while passing through the filter members 121, 122, and 123 is supplied to the outside of the water purifier through a water discharge tube and the water discharge nozzle 210.

Here, the purified water having room temperature may be supplied to the water discharge nozzle 210, or the purifier water may be heated or cooled in the water purifier body 100 to generate hot water or cold water to be supplied to the water discharge nozzle 210.

The outer appearance and configuration of the water purifier body 100 may be defined by the housing 110. The water discharge module 200 through which the water discharge nozzle 210 is exposed is installed on a lower end of a front cover defining a front surface of the housing 110.

Here, a lower portion of the front cover may be recessed backward with respect to the water discharge module 200 to provide a cavity 111 below the water discharge nozzle 210. Thus, a container such as a cup may be disposed below the water discharge nozzle 210 through the cavity 111. Also, when a lever 300 that selectively opens the water discharge nozzle 210 while rotating forward and backward is mounted below the water discharge module 200, a space required for a forward and backward swing motion (a rotation motion) of the lever 300 may be secured by the cavity 111.

Also, components such as various tubes, valves, and sensors are installed in the water purifier body 100.

For example, the water purifier body 100 may include the raw water tube 131 into which the raw water supplied from the outside is introduced, the filter members 121, 122, and 123 purifying the water passing through the raw water tube 131, a sensor member 141 installed on the raw water tube 131 to detect a flow speed or flow rate, and water discharge tubes 132, 133, 134, and 135 supplying the water passing through the filter members 121, 122, and 123 to the outside.

The water passing through the water discharge tubes 132, 133, 134, and 135 may be supplied to a user through the water discharge nozzle 210 disposed outside the water purifier body 100.

That is, in a flow path of the water, the raw water introduced into the raw water tube 131 may pass through the filter members 121, 122, and 123 and then be purified to generate purified water, and the purified water may be supplied to the outside of the water purifier body 100 via the water discharge tubes 132, 133, 134, and 135 and the water discharge nozzle 210.

A hot water module heating the purified water or a cold water module cooling the purified water may be installed on the water discharge tubes 132, 133, 134, and 135.

The filter members 121, 122, and 123 may be provided in plurality.

For example, the filter members 121, 122, and 123 may include a pre-carbon filter 121 through which raw water primarily passes, a reverse osmosis filter 122 (i.e., a RO filter) through which the purified water passing through the pre-carbon filter secondarily passes, and a post carbon filter 123 through which the purified water passing through the reverse osmosis filter 122 thirdly passes.

For reference, the reverse osmosis filter 122 may be a filter using a principle in which a plurality of membranes having a pore size of about 0.0001 μm on a surface are laminated, and osmosis is reversely pushed to pass therethrough. Here, a ratio of wastewater to the purified water is about 7:3. Also, impurities, environmental hormones, heavy metals, bacteria, and the like may be filtered. On the other hand, there is also an advantage that the RO filter may be used for filtering groundwater.

On the other hand, a RO filter has a disadvantage in that a purification time is slow, a separate pump has to be provided, and minerals that are good for the body are removed.

In an exemplary embodiment, a plurality of reverse osmosis filters may be arranged in series.

Various well-known filters including a hollow fiber membrane filter (i.e., a UF filter) may be applied instead of the reverse osmosis filter 122.

A drain tube may be connected to a lower end of the reverse osmosis filter 122, and a flow restrictor 144 may be installed in the drain tube.

The pre-carbon filter may be provided as a composite filter.

The pre-carbon filter 121 serves to filter heavy metals and general bacteria, and the post carbon filter 123 removes a gas component remaining in the water to improve the taste of the water.

In an exemplary embodiment, the water discharge tubes 132, 133, 134, and 135 may include a first water discharge tube 132 connecting the pre-carbon filter 121 to the reverse osmosis filter 122, a second water discharge tube 133 connecting the reverse osmosis filter 122 to the post carbon filter 123, and third water discharge tubes 134 and 135 connecting the post carbon filter 123 to the water discharge nozzle 210.

A purified water tank 150 in which the purified water is stored may be installed on the third water discharge tubes 134 and 135.

Thus, the purified water that is purified while passing through the filter member 121,122,123 flows to the purified water tank 150 through the third water discharge tube 134 connecting the post carbon filter 123 to the purified water tank 150 and then is stored in the purified water tank 150. Thereafter, when a water discharge request is made by the user, the water is supplied to the outside through the third water discharge tube 135 connecting the purified water tank 150 to the water discharge nozzle 210.

A feed valve 142 restricting a flow of water and a pump 143 increasing a pressure of water supplied to the reverse osmosis filter 122 may be installed on the second water discharge tube 133.

For example, the pump 143 may use a booster pump.

The pump 143 may be installed between the pre-carbon filter 121 and the reverse osmosis filter 122 so that a driving loss or the like due to foreign substances or the like does not occur. Thus, the purified water filtered while passing through the pre-carbon filter 121 may be forcibly supplied to the reverse osmosis filter 122 by the booster pump 143. The water forcibly supplied by the booster pump 143 may be purified while passing through the reverse osmosis filter 122.

Hereinafter, the 'water discharge module' that is a portion of the components according to an embodiment will be described.

Figure 3:
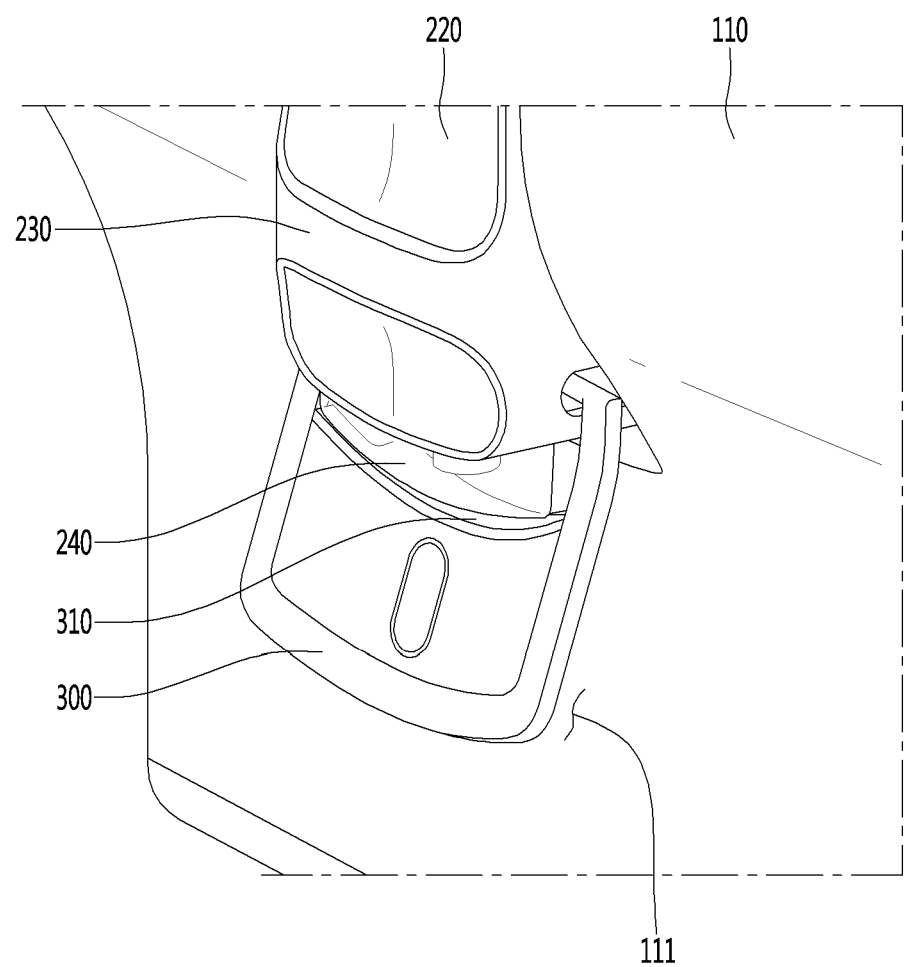
FIG. 3 is an enlarged perspective view illustrating a portion on which a water discharge module of the water purifier is mounted according to an embodiment.
Figure 4:
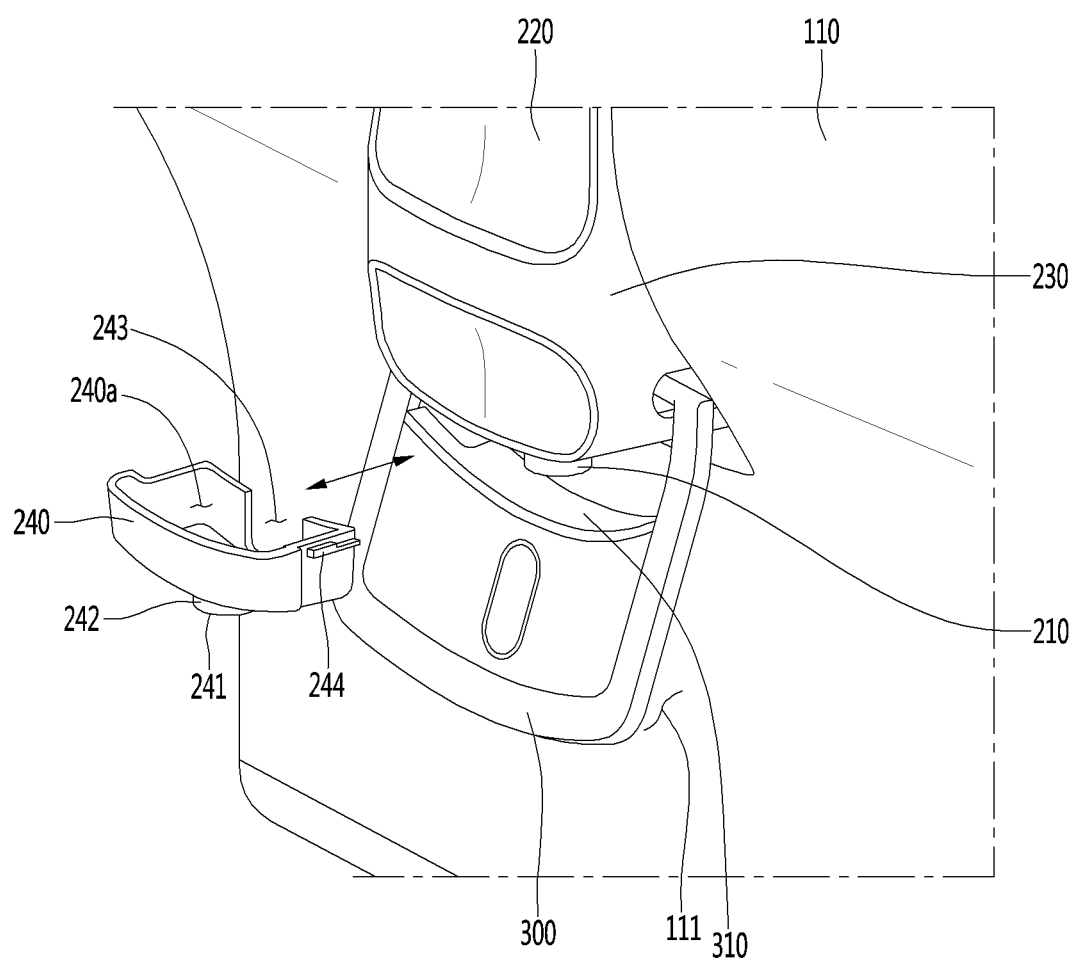
FIG. 4 is a perspective view illustrating a state in which a protection cap is separated in FIG. 3.

FIG. 3 is an enlarged perspective view illustrating a portion on which the water discharge module of the water purifier is mounted according to an embodiment. FIG. 4 is a perspective view illustrating a state in which a protection cap is separated in FIG. 3. Also, FIG. 5 is a cross-sectional view illustrating a portion of a region of FIG. 3.

Figure 5:
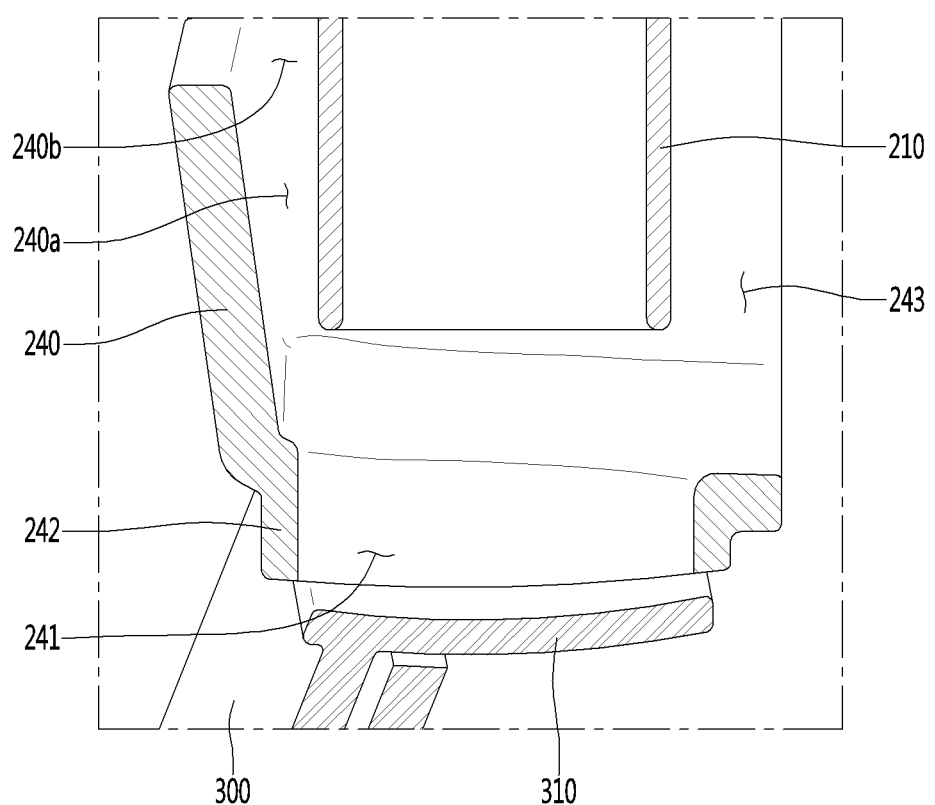
FIG. 5 is a cross-sectional view illustrating a portion of a region of FIG. 3.

Referring to FIGS. 3 to 5, the water discharge module 200 of the water purifier according to an embodiment may include a case 230 through which the water discharge nozzle 210 is exposed at a lower end thereof. The case 230 may be coupled to the front surface of the water purifier body 100 and a protection cap 240 may be detachably coupled to a lower end of the case 230 or the water purifier body 100 so that at least a portion of the water discharge nozzle 210 exposed to the lower end of the outside of the case 230 is covered by the protection cap 240.

In general, when the water purifier is used, the water discharge nozzle 210 through which the purified water is discharged may be contaminated by the bacteria of the user's hand and bacteria or dust floating in the air.

Also, in a process of dispensing water through the water discharge nozzle 210 to drink coffee, the water discharge nozzle 210 may be contaminated by foreign substances such as coffee, which contacts with the outflow nozzle 210, and thus, a large amount of bacteria may exist on the water discharge nozzle 210.

Also, flies, mosquitoes, and the like come into contact with the water discharge nozzle 210, and thus, the water discharge nozzle 210 may be contaminated by various bacteria.

According to an embodiment, the protection cap 240 may be installed at the lower end of the case 230 to protect the water discharge nozzle 210 from being contaminated by the various foreign substances and bacteria while covering the periphery of the water discharge nozzle 210.

The protection cap 240 may be vertically detached with respect to the case 230 of the water discharge module 200. Also, the protection cap 240 may be engaged with and detached from the case 230 by sliding the protection cap 240 backward and forward with respect to the case 230 of the water discharge module 200.

When the protection cap 240 is detachably coupled to the lower end of the case 230, the water discharge nozzle 210 may be covered by the protection cap 240 to prevent the water discharge nozzle from being contaminated.

Also, the protection cap 240 may be separately cleaned at any time, which is sanitary.

The protection cap 240 may have various shapes as long as the protection cap covers and protects the water discharge nozzle while allowing the water dispensed from the water discharge nozzle 210 to pass through the outside (a lower side) thereof.

For example, the protection cap 240 may have a container shape including an opened upper portion and a recess extending downward from the opened upper portion. Also, a water discharge hole 241 is defined in a position of a bottom surface of the protection cap 240, which corresponds to the water discharge nozzle 210.

The protection cap 240 defines a void portion 240*a* therein. The void portion 240*a* communicates with an opening 240*b* defined in an upper end of the protection cap 240. Also, the void portion 240*a* communicates with the water discharge hole 241. Thus, the water discharged from the water discharge nozzle 210 passes through the void portion 240*a* and is then disposed to the outside of the protection cap 240 through the water discharge hole 241.

For reference, in the state in which the protection cap 240 is mounted on the water discharge module 200, a center of the water discharge nozzle 210 and a center of the water discharge hole 241 may be disposed in a straight line.

In this embodiment, an extension part 242 protruding downward may be disposed on a central portion of the bottom surface of the protection cap 240, and the water discharge hole 241 may pass through the extension part 242.

Thus, the user may easily identify the position of the water discharge hole 241, through which the water is discharged, from the outside.

For reference, the water discharge hole 241 may have a diameter greater than that of the water discharge nozzle 210. Thus, when a water stream discharged through the water discharge nozzle 210 is discharged to the outside of the protection cap 240 through the water discharge hole 241, the water may not contact the protection cap 240 but pass through the water discharge hole 241, thus maintaining a sanitary state of the water stream.

Also, the protection cap 240 may be slid forward and backward with respect to the case 230 and may be detached from the lower end of the case 230, and a through-groove 243 through which the water discharge nozzle 210 passes during the sliding of the protection cap 240 may be defined in a rear surface of the protection cap 240.

When the through-groove 243 is defined as described above, the protection cap 240 may be mounted on the lower end of the case 230 while the protection cap 240 is slid forward, or the water discharge nozzle 210 may pass through the through-groove 243 when the protection cap 230 is separated from the lower end of the case 230 while the protection cap 240 is slid backward. Thus, the sliding operation of the protection cap 240 may be performed without interfering with the water discharge nozzle 210.

Also, the through-groove 243 may have a size greater than that of the water discharge nozzle 210 so that the water discharge nozzle 210 more easily passes through the through-groove 243.

To realize the sliding operation of the protection cap 240, a slide protrusion 244 protruding to the outside along the sliding direction (the forward and backward direction) may be disposed on each of both side surfaces of the protection cap 240, and a slide groove (not shown) into which the slide protrusion 244 is slidably inserted may be defined in the front surface of the case 230 or the housing 110.

The forward and backward sliding operation of the protection cap (240) may be guided by the above-described slide protrusion 244 and slide groove (not shown). Also, the state in which the protection cap 240 is mounted on the lower end of the case 230 may be maintained.

Also, the protection cap 240 may be formed of a transparent or translucent material.

As described above, when the protection cap 240 is made of the transparent material, the user may identify the position of the water discharge nozzle 210 in the state in which the protection cap 240 covers the water discharge nozzle 210.

Thus, the user may locate the container such as the cup at the lower side of the water discharge nozzle 210 to correspond to the position of the water discharge nozzle 210.

Referring again to FIGS. 3 to 5, the lever 300 may be disposed below the water discharge nozzle 210 and the water discharge hole 241.

The lever 300 may be disposed below the water discharge nozzle 210 to rotate forward and backward, thereby opening the water discharge nozzle 210.

For example, the lever 300 may be disposed below the water discharge hole 241 in a state in which a separate pressing force is not applied to the lever 300. Thus, at least a portion of the water discharge hole 241 may be covered by the lever 300 disposed below the water discharge hole 241 to prevent foreign substances from being introduced into the water discharge hole 241.

In detail, a covering part 310 extending backward may be disposed on a surface of the lever 300, which faces the water discharge hole 241, and thus, the water discharge hole 241 may be more reliably covered by the covering part 310. Thus, the introduction of the foreign substances into the water discharge hole 241 may be more reliably prevented.

The covering part 310 may have an area greater than that of the water discharge hole 241. Thus, the covering part 310 may more reliably cover the water discharge hole 241.

Also, the lower end of the water discharge hole 241 and the covering part 310 may be spaced a predetermined distance from each other. Thus, when the lever 300 rotates, the covering part 310 may not interfere with the water discharge hole 241, and thus, the lever 300 may easily rotate.

In the case 230 of the water discharge module 200 exposed to the front surface of the housing 110, at least one of a display unit displaying various information and an input unit receiving various information may be disposed above the water discharge nozzle 210.

For example, a manipulation display unit 220 inputting an operation command of the water purifier by the user and simultaneously displaying an operation state of the water purifier may be disposed on the front surface of the water discharge module 200.

The manipulation display unit 220 may be provided as the form of a plurality of buttons or a touch screen, and light may be irradiated onto each of the buttons. That is, when the user presses or touches the button of the manipulation display unit 220, light may be irradiated onto the selected button to allow the user to easily recognize the button and also to serve as a function of a display part.

The manipulation display unit 220 is provided with buttons for selecting a type of water to be dispensed, i.e., a button for selecting the cold water, the hot water, or the purified water (room temperature water), a button for continuously dispensing water, a button for confirming whether power for hot water is applied, and a display part for displaying temperatures of the hot water and the cold water.

Alternatively, the manipulation display unit 220 may further include a button for performing an additional function, and a portion of the buttons may be omitted. For example, a button that enables extraction of ice or the like may be provided, an informing part such as a warning indicator for warning when the hot water is dispensed, a replacement cycle of the filter, a storage amount indicator for the purified water, or the like may be provided, and a timer for controlling an operation time of the water purifier, a manipulation time of the button, or a extraction completion time of the purified water may be further provided according to the functions desired.

Also, according to the type and shape of the water purifier, the manipulation display unit 220 may be further provided with a lighting so that it is used at night without the illumination, and an additional function may be further provided. Here, the button and the display part provided on the manipulation display unit 220 may not be limited in number and shape.

Hereinafter, an opening/closing structure of the water discharge nozzle will be described.

Figure 6:
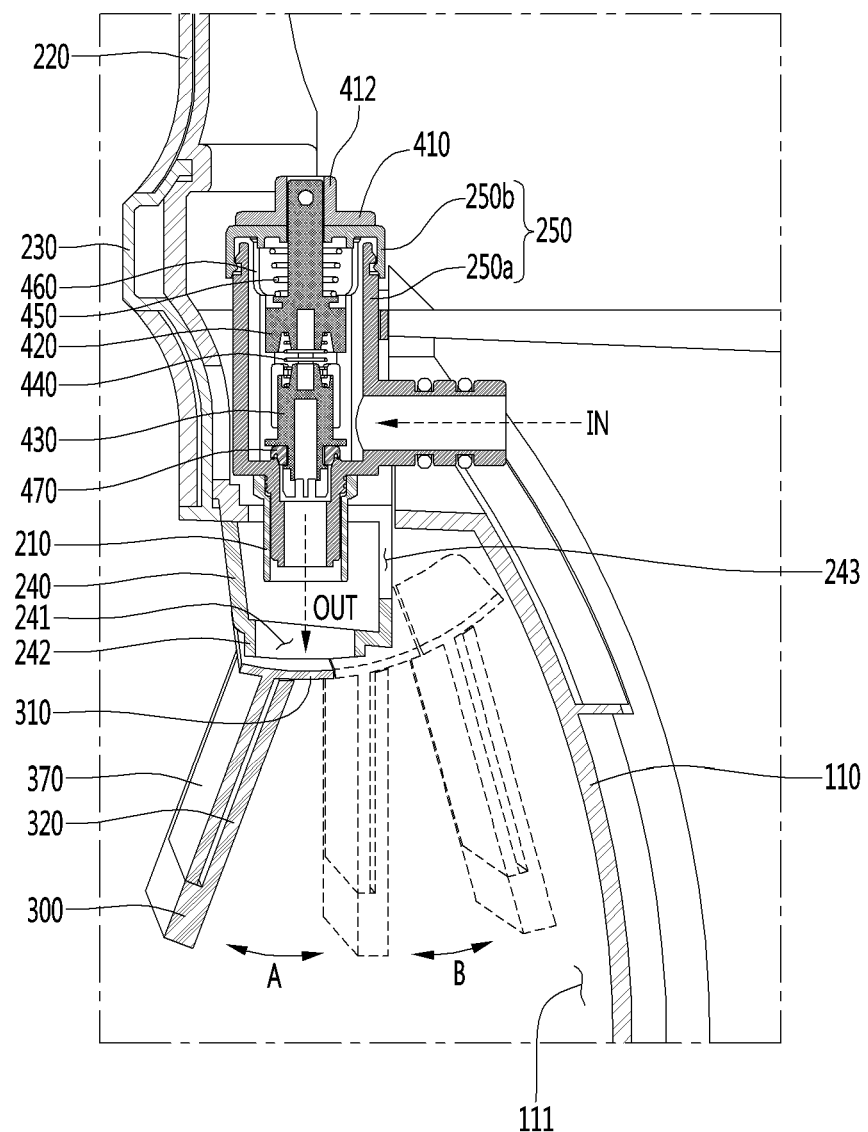
FIG. 6 is a longitudinal cross-sectional view of a portion on which the water discharge module of the water purifier is mounted according to an embodiment.
Figure 7:
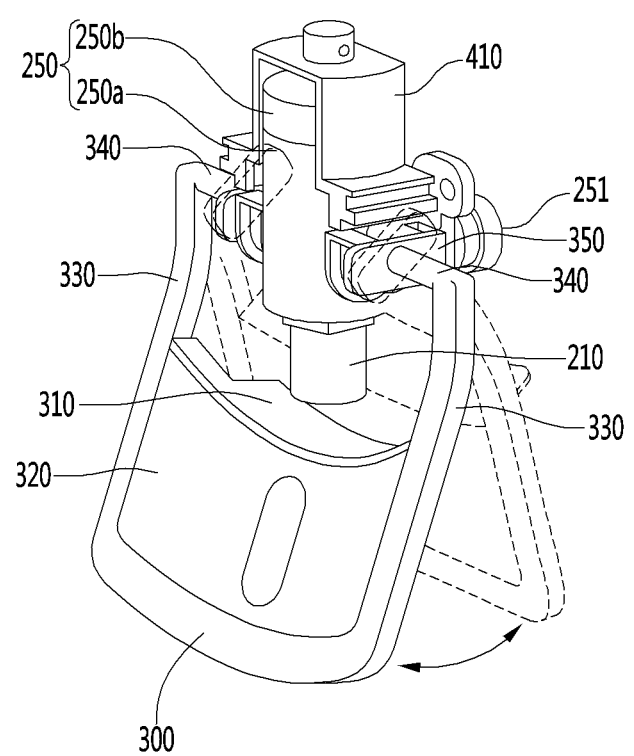
FIG. 7 is a perspective view illustrating a state in which a case is removed from the water discharge module of the water purifier according to an embodiment.
Figure 8:
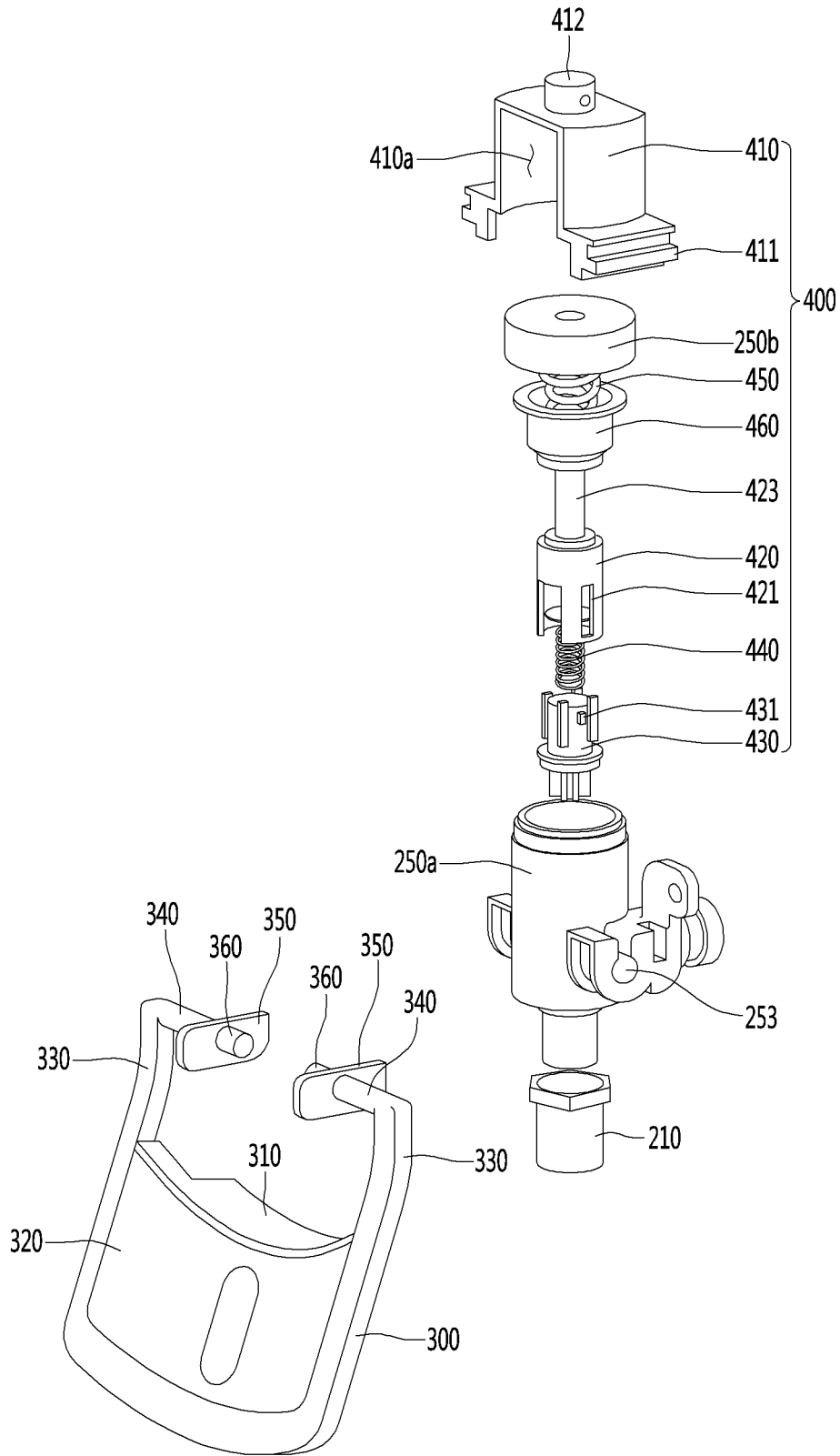
FIG. 8 is an exploded perspective view of FIG. 7.

FIG. 6 is a longitudinal cross-sectional view of a portion on which the water discharge module of the water purifier is mounted according to an embodiment. Also, FIG. 7 is a perspective view illustrating a state in which a case is removed from the water discharge module of the water purifier according to an embodiment. Also, FIG. 8 is an exploded perspective view of FIG. 7.

Referring again to FIGS. 6 to 8, the water discharge nozzle 210 may be opened by the operation of the lever 300.

For this, the water discharge module 200 includes a water inflow hole 251 which is provided inside the case 230 and through which the water passing through the filter is introduced, a chamber 250 providing an accommodation part 252 in which the water introduced through the water inflow hole 251 is accommodated and having a lower end communicating with the opened upper side of the water discharge nozzle 210, an opening/closing unit 400 provided inside the chamber 250 to selectively open and close the opened upper side of the water discharge nozzle 210 while being elevated above the water discharge nozzle 210, and a lever 300 elevating the opening/closing unit 400 while rotating forward and backward below the water discharge nozzle 210.

Here, the chamber 250 may be provided in an upper portion of the inside of the housing 110 and be connected to the purified water tank 150, in which the water passing through the filter is stored, through a separate tube. Thus, the water of the purified water tank 150 may be discharged to the water discharge nozzle 210 via the chamber 250.

In addition, the chamber 250 may be connected to a hot water tank or a cold water tank without being connected to the purified water tank. Also, the chamber 250 may be directly connected to the filter member without being connected to a separate tank.

The chamber 250 may include a body part 250a having an opened upper side, one side into which the water passing through the filter is introduced, and a lower side communicating with the water discharge nozzle 210 and a plug part 250b covering the opened upper side of the body part 250a. The body part 250a and the plug part 250b may be coupled to each other in a female screw and male screw manner or a hook manner.

As described above, when the lever 300 rotates forward or backward by the manipulation of the user, the opening/closing unit 400 interlocked with the lever 300 ascends. As described above, when the opening/closing unit 400 ascends, the upper portion covering the opening/closing unit 400 may be opened to allow the water introduced into the accommodation part 252 of the chamber 250 to be supplied to the outside of the water purifier through the water discharge nozzle 210.

Here, the connection structure between the lever 300 and the opening/closing unit 400 may be variously modified as long as the rotation motion of the lever 300 is transmitted to the opening/closing unit 400 into a reciprocating motion (vertical motion).

For example, the lever may include a pressing part 320 disposed below the water discharge nozzle 210 and having a front surface having a curved or flat shape to easily contact the container such as the cup, a vertical part 330 extending upward from each of both sides of the pressing part 320, a horizontal part 340 extending from an end of the vertical part 330 to the inside of the case 230, and a plate-shaped cam member 350 disposed on an end of the horizontal part 340 to convert a rotation motion of the horizontal part 340 into the reciprocating motion (the vertical motion) of opening/closing unit 400.

Here, the cam member 350 may have an oval shape. Also, the cam member 350 may have a rectangular shape having rounded corners. In addition, the cam member 350 may have various alternative shapes as long as the cam member has a curved surface and an inclined surface.

As described above, when the horizontal part 340 rotates while the pressing part is pressed backward by the manipulation of the user, the cam member 350 disposed on the end of the horizontal part 340 may rotate. When the cam member 350 rotates as described above, the cam member 350 may increase in height, and thus, the opening/closing unit 40 may ascend. As described above, when the opening/closing unit 400 ascends, the upper portion covering the opening/closing unit 400 may be opened to allow the water introduced into the accommodation part 252 of the chamber 250 to be supplied to the outside of the water purifier through the water discharge nozzle 210.

In this embodiment, the covering part 310 may extend backward from an upper end of the pressing part.

Also, a rotation shaft 360 protruding inward may be disposed on an inner surface of the cam member 350. Also, a rotation groove 253 into which the rotation shaft 360 is rotatably inserted may be defined in an outer surface of the chamber 250. The rotation groove 253 may be defined in a protrusion protruding to the outside of the chamber 250, and a cutoff groove with which the rotation groove 253 intersects may be defined above the rotation groove 253.

As described above, when the rotation shaft 360 is rotatably coupled to the rotation groove 253, the lever 300 may stably rotate in a state of being supported on the case 230 and the chamber 250.

A cushion member (not shown) made of an elastic material may be disposed on the rear surface of the lever 300.

For example, the cushion member (not shown) may be disposed on a rear end of the above-described covering part 310.

For another example, the cushion member (not shown) may be disposed on a lower end of a rear surface of the pressing part 320.

As described above, when the cushion member (not shown) is disposed on the rear surface of the lever 300, when the lever 300 rotates backward, even though the lever 300 contacts the front surface of the housing 110, the cushion member (not shown) having the elasticity may contact the housing 110 to reduce an impact applied to the lever 300 and the housing 110, and thus, damage due to collision between the lever 300 and the housing 110 may be prevented.

For example, the cushion member (not shown) may be made of a material such as silicon and rubber.

As modified example, when the lever 300 rotates, the cushion member (not shown) may be disposed on a portion of an area of the housing 110, which contacts the rear surface of the lever 300.

Also, a friction member 370 made of an elastic material to prevent the pressing part from being slid may be disposed on the front surface of the pressing part 320.

As described above, when the friction member 370 is provided, the container may be prevented from being slid on the pressing part 320 when the pressing part 320 is pushed by using the container such as the cup so that the lever 300 rotates backward. Thus, the user may stably press the lever 300 by using the container.

The friction member 370 may be made of a material such as silicon, rubber, and the like.

Hereinafter, the 'opening/closing unit' will be described.

Referring again to FIGS. 6 to 8, the opening/closing unit 400 may include an elevation cap 410 disposed outside the chamber 250 to ascend by being pushed upward by the cam member 350 when the cam member 350 of the lever 300 rotates and opening/closing members 420 and 430 provided inside the chamber 250 and connected to the elevation cap 410 to selectively open and close the opened upper side of the water discharge nozzle 210 while ascending together with the elevation cap 410.

For example, the chamber may have a cylindrical shape. Also, the elevation cap 410 may have a '⊏'-shaped cross-section. The elevation cap 410 may be disposed to surround at least a portion of the upper side of the chamber 250. Here, the upper side of the chamber 250 may be accommodated into an inner space 410a of the elevation cap 410.

Also, a wing part 411 extending outward may be disposed on a lower end of each of both sides of the elevation cap 410. The above-described cam member 350 may be disposed against a lower end of the wing part 411. Thus, when the cam member 350 rotates, the wing part 411 may be pushed upward, and thus, the elevation cap 410 may ascend.

Figure 9:
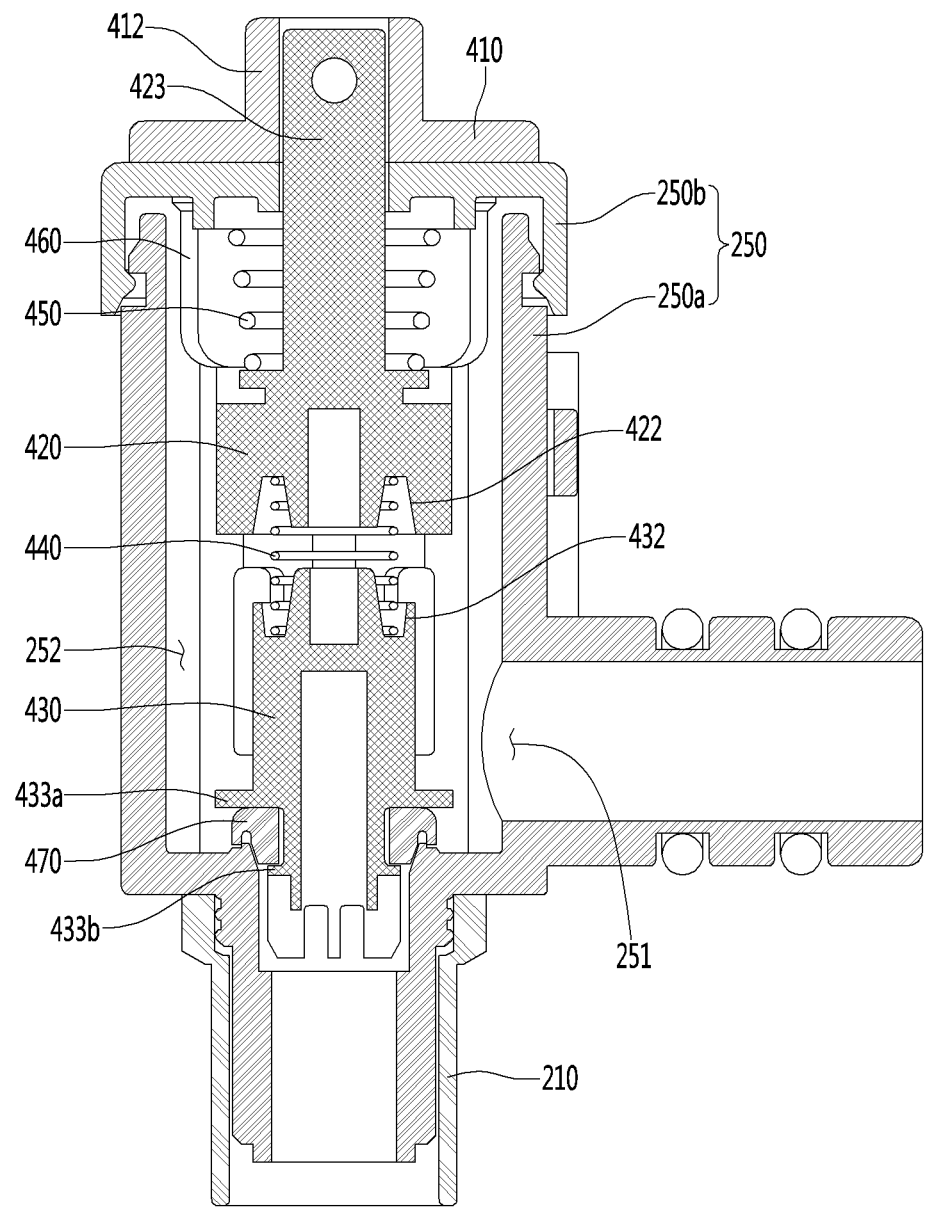
FIGS. 9 to 10 are longitudinal cross-sectional views of a chamber and an opening/closing unit in a standby state in which a lever does not operate.
Figure 10:
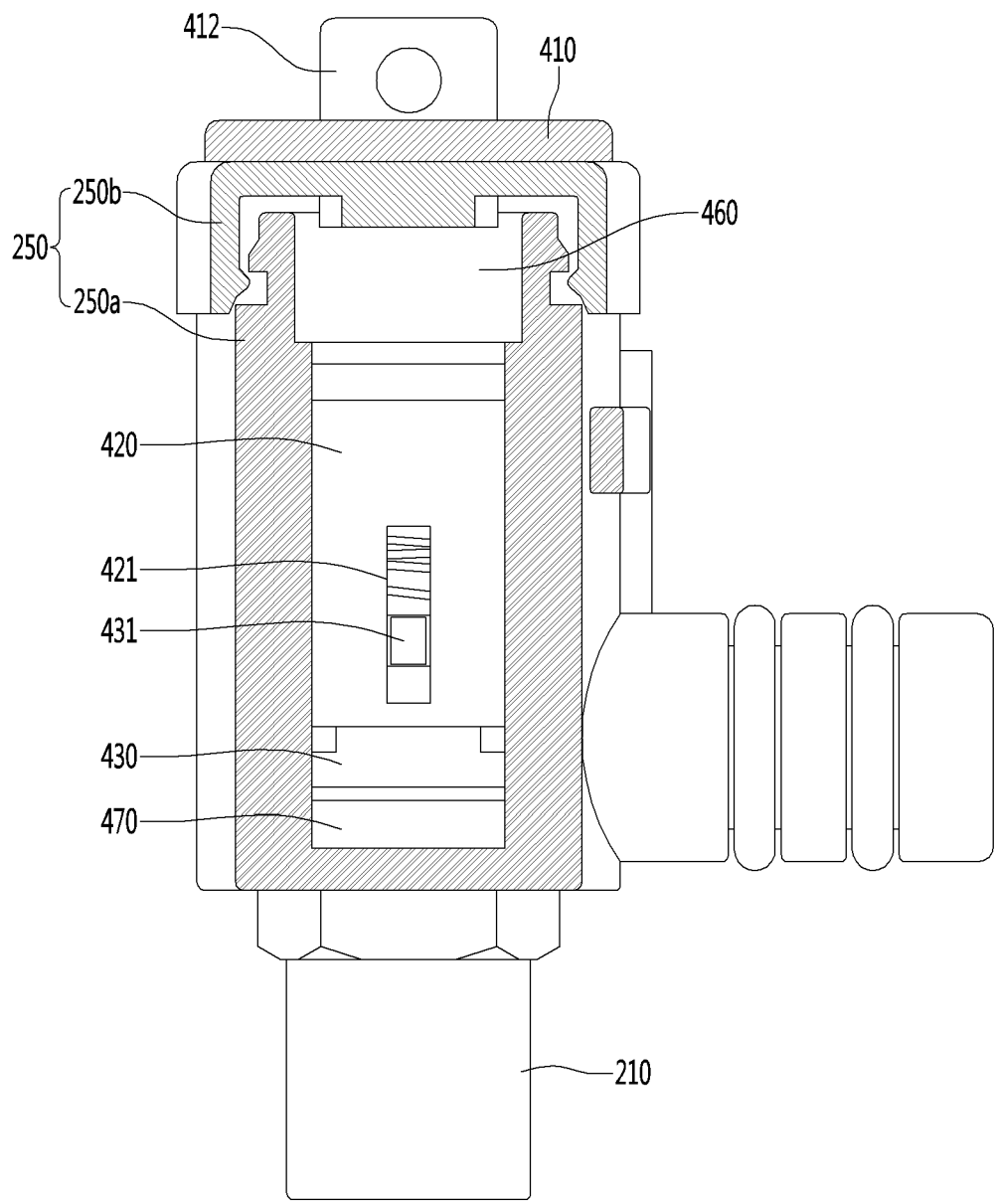

FIGS. 9 to 10 are longitudinal cross-sectional views of the chamber and the opening/closing unit in a standby state in which the lever has not been activated.

Referring to FIGS. 8 to 10, the opening/closing members 420 and 430 include the first opening/closing member 420 directly connected to the elevation cap 410 and the second opening/closing member 430 having a lower end that selectively opens and closes the opened upper side of the water discharge nozzle 210. A first compression spring 440 is inserted between the first opening/closing member 420 and the second opening/closing member 430.

Thus, when the elevation cap 410 ascends, the first opening/closing member 420 connected to the elevation cap 410 may also ascend.

The first compression spring 440 provides tensile force so that the first opening/closing member 420 and the second opening/closing member 430 are spaced apart from each other.

Spring insertion grooves 422 and 432 into which upper and lower ends of the first compression spring 440 are respectively inserted may be defined in a lower end of the first opening/closing member 420 and an upper end of the second opening/closing member 430.

Thus, the first compression spring 440 may be stably inserted between the first opening member 420 and the second opening/closing member 430 in a state in which the fixing force is secured.

In this state, even though the first opening/closing member 420 ascends, the second opening/closing member 430 may not ascend.

Thus, it may be necessary to connect the first opening/closing member 420 to the second opening/closing member 430 so that the second opening/closing member 430 ascends together when the first opening/closing member 420 ascends.

For example, the first opening/closing member 420 may have a hollow part, of which a lower side is opened, therein. An upper side of the second opening/closing member 430 may be accommodated into the hollow part of the first opening/closing member 420.

Here, the first opening/closing member 420 may have an inner diameter greater than an outer diameter of the second opening/closing member 430. Thus, the elevation operation of the first opening/closing member 420 and the second opening/closing member 430 may be easily performed.

Also, a long hole 421 communicating with the hollow part is vertically defined in the first opening/closing member 420 and closed at a lower end by a portion of the hollow part, and a lifting protrusion 431 inserted into the long hole 421 may be disposed on an outer surface of the second opening/closing member 430.

Thus, when the first opening/closing member 420 ascends together with the elevation cap 410, the lifting protrusion 431 may be hooked with the closed lower end of the long hole 421 in the hollow part, and thus, the second opening/closing member 430 may ascend together with the first opening/closing member 420.

Figure 11:
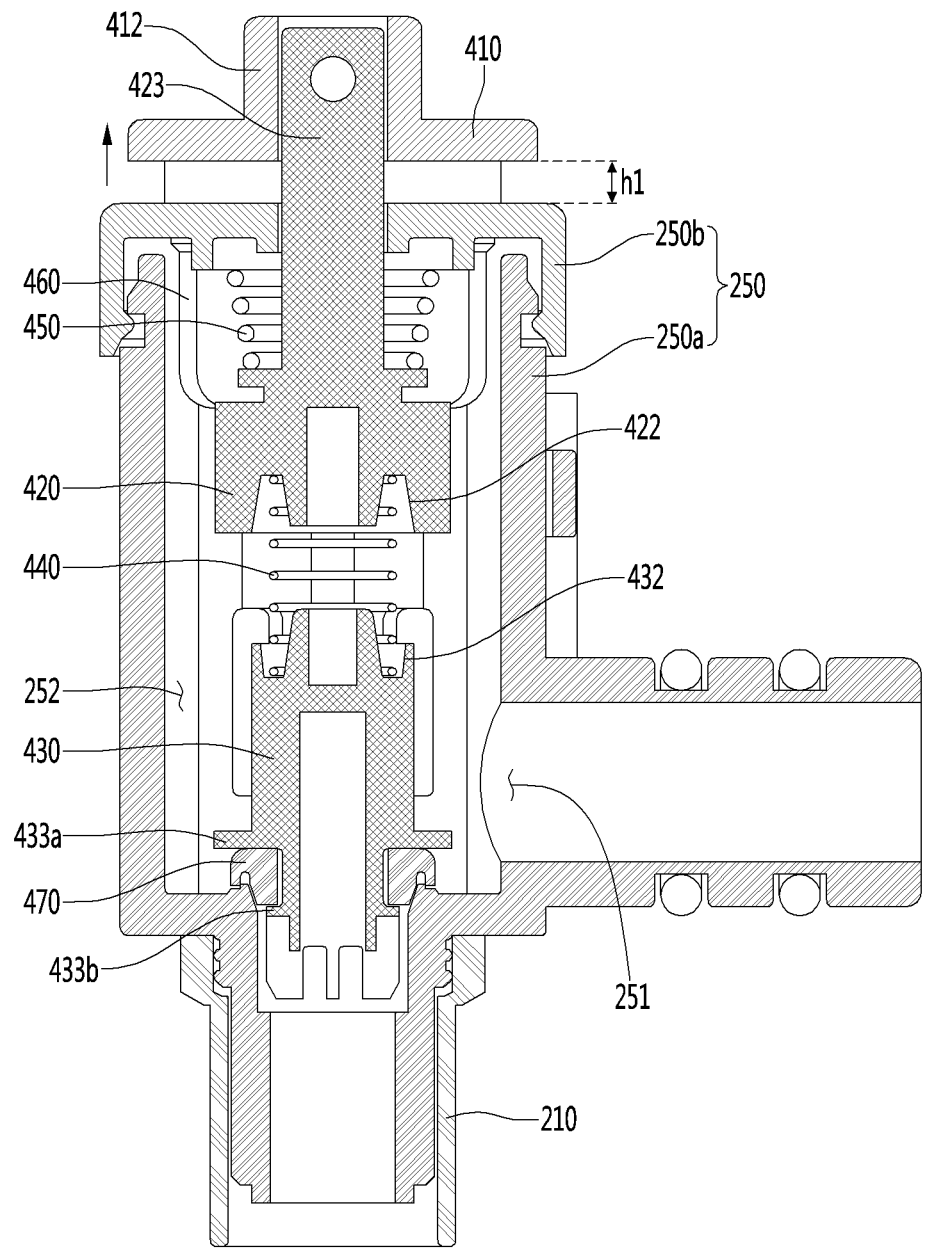
FIGS. 11 to 12 are longitudinal cross-sectional views of the chamber and the opening/closing unit in a state in which the lever operates backward through a first rotation section.
Figure 12:
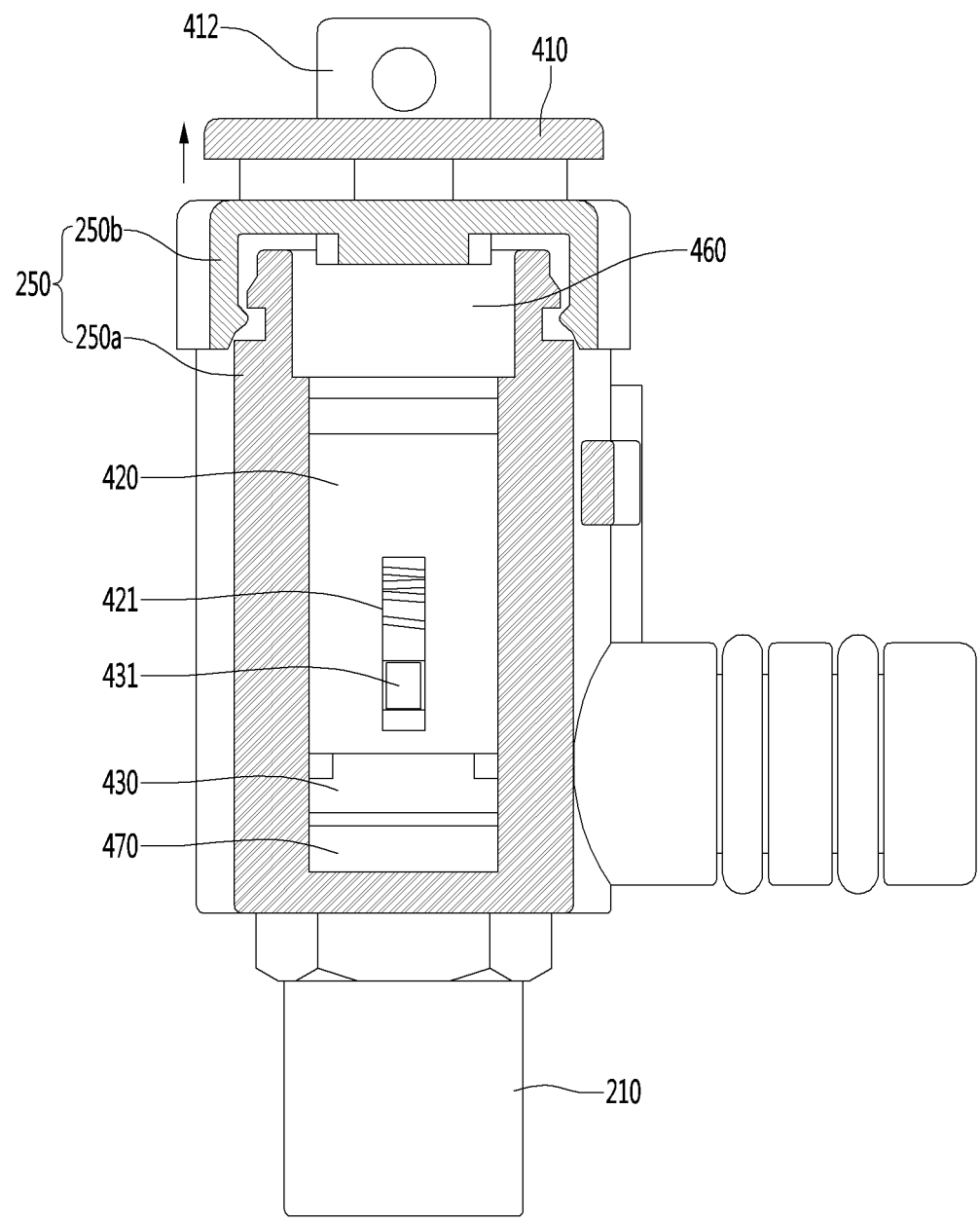
Figure 13:
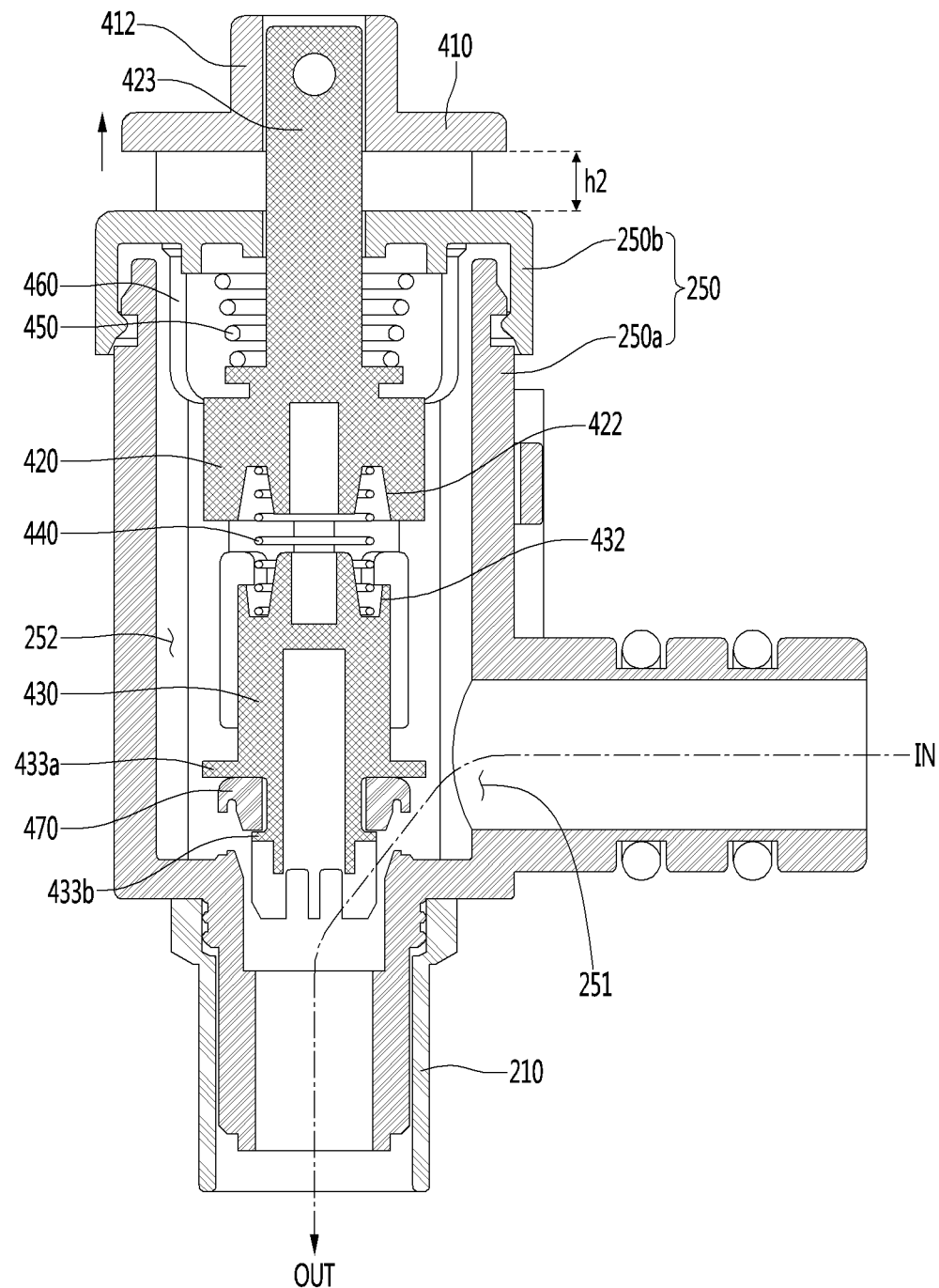
FIGS. 13 to 14 are longitudinal cross-sectional views of the chamber and the opening/closing unit in a state in which the lever operates backward through a second rotation section behind the first rotation section.
Figure 14:
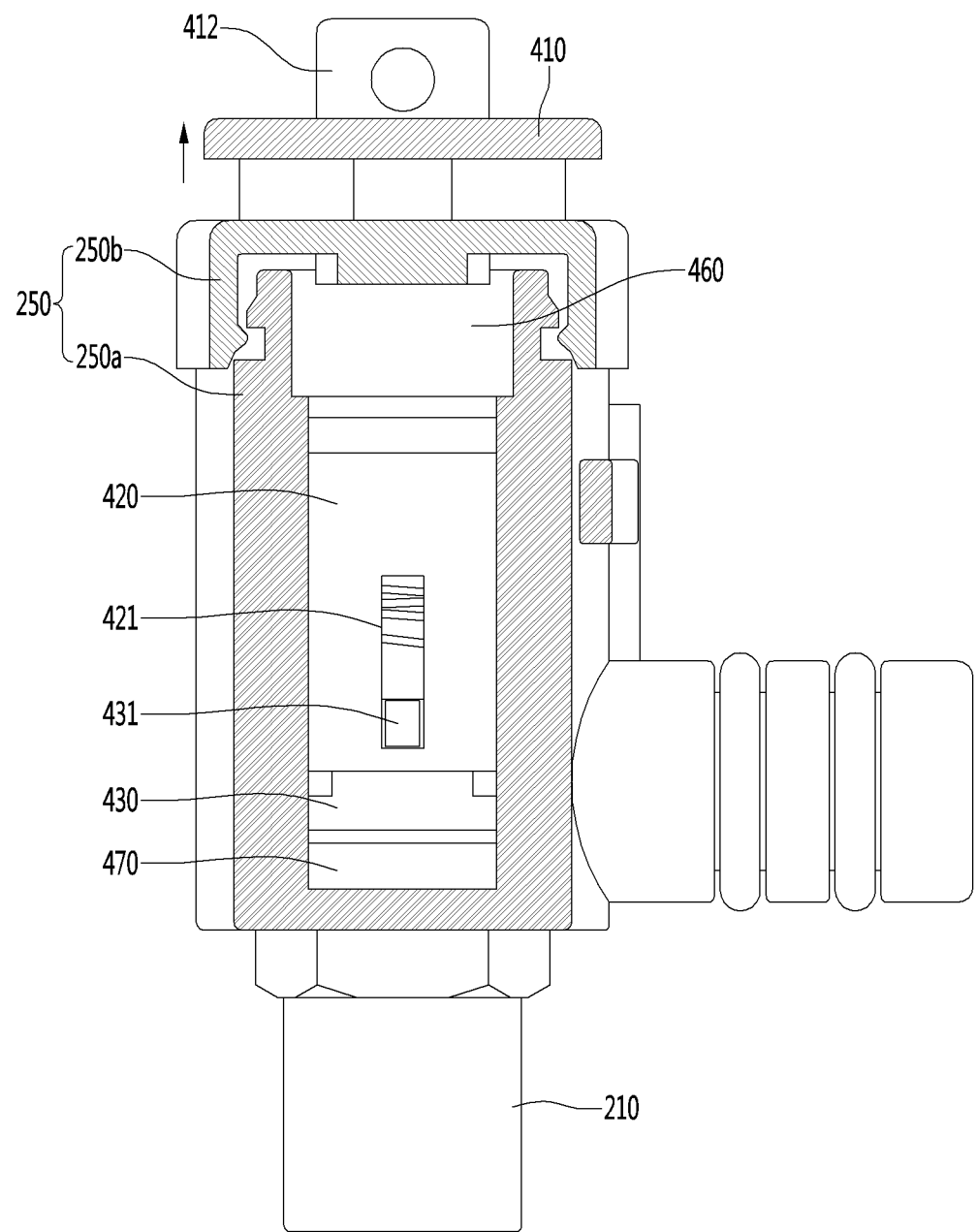

FIGS. 11 to 12 are longitudinal cross-sectional views of the chamber and the opening/closing unit in a state in which the lever primarily operates backward. Also, FIGS. 13 to 14 are longitudinal cross-sectional views of the chamber and the opening/closing unit in a state in which the lever secondarily operates backward.

The long hole 421 may have a length greater than that of the lifting protrusion 431. Thus, when the first opening/closing member 420 ascends by a first height h1 together with the elevation cap 410, the lifting protrusion 431 may be hooked with the lower closed end of the long hole 421. When the elevation cap 410 and the first opening/closing member 420 ascend at a height higher than the first height h1, the second opening/closing member 430 may also ascend together with the first opening/closing member 420.

As described above, when the second opening/closing member 430 ascends, the upper side of the water discharge nozzle 210, which is covered by the lower end of the second opening/closing member 430, may be opened so that the water introduced into the chamber 250 through the water inflow hole 251 is discharged to the water discharge nozzle 210.

If the second opening/closing member 430 does not ascend, the upper side of the water discharge nozzle 210 may be in a state of being covered by the lower end of the second opening/closing member 430.

A sealing member 470 having a ring shape may be disposed on the lower end of the second opening/closing member 430. The sealing member 470 may be made of a material such as rubber, silicon, and the like. As described above, when the sealing member 470 is provided, a phenomena in which the water leaks between the second opening/closing member 430 and the water discharge nozzle 210 may be prevented in the state in which the second opening/closing member 430 covers the water discharge nozzle 210.

Also, a pair of fixing protrusions 433a and 433b vertically spaced apart from each other so that the sealing member 470 is inserted and protruding outward along a circumference of the second opening/closing member 430 may be disposed on the lower end of the second opening/closing member 430.

In this case, an accommodation groove that is recessed inward may be defined between the fixing protrusions 433a and 433b, and the sealing member 470 may be inserted into the accommodation groove to secure the fixing force of the sealing member 470, thereby preventing the sealing member 470 from being separated.

Also, the upper end of the first opening/closing member 420 may pass through a top surface of the chamber 250 and be connected to the elevation cap 410, and a second compression spring 450 may be inserted between the first opening/closing member 420 and the top surface of the inside of the chamber 250.

In detail, a connection shaft 423 protrudes upward from the upper end of the first opening/closing member 420, and the connection shaft 423 passes through the plug part 250b of the chamber 250 and is coupled to the elevation cap 410.

Here, a boss 412 extending upward may be disposed at a position of the top surface of the elevation cap 410, at which the connection shaft 423 passes.

Thus, when the elevation cap 410 ascends, the connection shaft 423 connected to the elevation cap 410 may ascend, and the first opening/closing member 420 may ascend.

Also, the second compression spring 450 may have a shape having a diameter that gradually decreases downward.

The second compression spring 450 provides tensile force (pushing force) so that the plug part 250b of the chamber 250 and the first opening/closing member 420 are spaced apart from each other.

Here, the connection shaft 423 may pass through a center of the second compression spring 450. Also, an upper end of the second compression spring 450 may contact to be supported by the plug part 250b of the chamber 250, and a lower end of the second compression spring 450 may contact to be supported by a flange extending outward from a lower end of the connection shaft 423.

Also, a spring cover 460 covering the outside of the second compression spring 450 to prevent the second compression spring 450 from being separated may be disposed on the upper end of the inside of the chamber 250.

Referring again to FIGS. 6 and 9 to 14, when the lever 300 rotates backward, a section in which the lever 300 rotates may include a first rotation section A in which only the elevation cap 410 and the first opening/closing member 420 ascend, and the second opening/closing member 430 is fixed to cover the upper side of the water discharge nozzle 210 and a second rotation section B which is defined behind the first rotation section A and in which the elevation cap 410, the first opening/closing member 420, and the second opening/closing member 430 ascend to allow the second opening/closing member 430 to open the upper side of the water discharge nozzle 210.

That is, when the lever 300 is pushed backward by using the container such as the cup, the lever rotates first in the first rotation section A and then rotates in the second rotation section B.

Here, while the lever 300 rotates in the first rotation section A, the water discharge nozzle 210 is not opened, and only while the lever 300 rotates in the second rotation section B, the water discharge nozzle 210 is opened.

Hereinafter, a process of opening and closing the water discharge nozzle 210 through the rotation of the lever 300 will be described in more detail.

Referring to FIGS. 9 and 10, in a state in which an external force is not applied to the lever 300, the second opening/closing member 430 covers the upper side of the water discharge nozzle 210.

Here, the first opening/closing member 420 is in a state of being pressed downward by the second compression spring 450. Also, the elevation cap 410 connected to the first opening/closing member 420 may also be in a lower position against the plug part 250b of chamber 250. Also, the second opening/closing member 430 is in a state of being pressed downward by the first compression spring 440. For reference, resistance force when the second compression spring 450 is compressed may be equal to or greater than that when the first compression spring 440 is compressed. Thus, the state in which the second opening/closing member is pressed downward may be maintained.

In this state, when the user pushes the lever 300 so as to discharge water, the lever 300 primarily rotates backward while passing through the first rotation section A.

Referring to FIGS. 11 and 12, in the state in which the lever 300 passes through the first rotation section A, when the cam member 350 of the lever 300 rotates, the cam member 350 may increase in height, and the elevation cap 410 ascends as the cam member 350 presses against a lower end of wing part 411 of elevation cap 410. Also, the first opening/closing member 420 connected to the elevation cap 410 ascends by the first height h1.

Here, the second compression spring 450 disposed between the top surface of the chamber 250 and the first opening/closing member 420 is compressed. Also, although the first opening/closing member 420 ascends, the second opening/closing member 430 is maintained in the fixed state. In detail, when the first opening/closing member 420 ascends, the long hole 421 ascends, and the lifting protrusion 431 inserted into the long hole 421 relatively descends along the long hole 421 until the lifting protrusion 431 reaches the lower end of the long hole 421. In this process, the first compression spring 440 inserted between the first opening/closing member 420 and the second opening/closing member 430 may tensioned, and the second opening/closing member 430 may be maintained in the state of covering the upper side of the water discharge nozzle 210 by the tensile force (the pushing force) of the first compression spring 440.

In this state, when the user further pushes the lever 300, the lever 300 further rotates backward, and thus, the lever 300 passes through the second rotation section B.

Referring to FIGS. 13 and 14, in the state in which the lever 300 passes through the second rotation section B, the cam member 350 of the lever 300 further rotates, and the elevation cap 410 further ascends. Also, the first opening/closing member 420 connected to the elevation cap 410 ascends by a second height h2 higher than the first height h1.

Here, the second compression spring 450 disposed between the top surface of the chamber 250 and the first opening/closing member 420 may be maintained in the compressed state or may be further compressed. Also, the second compression spring 450 may be tensioned in an opposite direction.

Also, since the first opening/closing member 420 additionally ascends, the second opening/closing member 430 may also ascend.

In detail, when the first opening/closing member additionally ascends, the long hole 421 may also ascend. Also, the lifting protrusion 431 hooked with the lower closed end of the long hole 421 may ascend together with the long hole 421, as shown in FIG. 14. In this process, the first compression spring 440 inserted between the first opening/closing member 420 and the second opening/closing member 430 may be maintained in the tensioned state or may be further tensioned. Also, the first compression spring 440 may be tensioned in an opposite direction.

As described above, when the second opening/closing member 430 ascends, the upper side of the water discharge nozzle 210, which is covered by the second opening/closing member 430, may be opened so that the water introduced the into the chamber 250 through the water inflow hole 251 is supplied to the outside of the water purifier through the water discharge nozzle 210.

As described above, the water dispensing through the water discharge nozzle 210 due to the ascending of the second opening/closing member 430 may be continuous during the pushing of the lever 300 by using the container such as the cup by the user.

Thereafter, after a predetermined time elapses, when the water discharge is sufficient as desired by the user, the user separates the container such as the cup from the lever 300, and thus, the pressing force applied to the lever 300 is released.

When the pressing force applied to the lever 300 is released as described above, the first opening/closing member 420 descends by the tensile force of the second compression spring 450, and the elevation cap 410 connected to the first opening/closing member 420 descends also. In this process, the wing part 411 of the elevation cap 410 may push the cam member 350 downward, and while the cam member 350 rotates, the cam member 350 may decrease in height. As a result, the lever 300 may rotate forward to return to its initial position. Also, while the first opening/closing member 420 descends, the second opening/closing member 430 descends also, and the lower end of the second opening/closing member 430 covers the upper side of the water discharge nozzle 210. Thus, the water dispensing from the water discharge nozzle 210 is ended.

In this case, when the water dispensing is ended, and then, the lever 300 rotates, the water discharge nozzle 210 may be covered before the lever 300 reaches the vertical lower side of the water discharge nozzle 210 to end the water dispensing. Thus, since the water discharged from the water discharge nozzle 210 does not contact the lever 300, the phenomenon such as the water splashing may be prevented, and the lever 300 may be sanitarily managed.

Although not shown, if the user desires to continuously dispense the water, when the lever 300 rotates forward at a predetermined angle, the lever 300 may be maintained in the forward rotating state.

For example, when the user allows the lever 300 to rotate by about 90° forward, the lever 300 may be fixed in its position. In detail, the cam member 350 may be fixed in a state of being vertically erected (a state in which the length is maximum) in FIG. 7. Thus, all of the elevation cap 410, the first opening/closing member 420, and the second opening/closing member 420 may be maintained in the ascended state, and the water discharge nozzle 210 is continuously opened. Thus, the water dispensing from the water discharge nozzle 210 is enabled.

Thereafter, when the user allows the lever 300 to return to its original position, the cam member 350 returns to the horizontal state (a state in which the length is minimized) while the lever 300 rotates backward. Thus, all of the elevation cap 410, the first opening/closing member 420, and the second opening/closing member 420 may descend, and the water discharge nozzle 210 may be covered by the second opening/closing member 420. Thus, the water dispensing from the water discharge nozzle 210 is ended.

As described above, according to the embodiment, the periphery of the water discharge nozzle may be covered by the protection cap to reduce the possibility of occurrence of the contamination of the water discharge nozzle. Also, the user may always receive the clean water through the water discharge nozzle that is sanitary. Also, the user may recognize the position of the water dispensing nozzle in the state in which the water discharge nozzle is covered by the protection cap. Also, the protection cap may be easily cleaned because the protection cap covering the water discharge nozzle is easily detachable.

Also, the water discharge nozzle may not be opened even through the lever rotates at a predetermined angle, but the water discharge nozzle may be opened to dispense the water only when the user's water dispensing intention is clearly transmitted even if the lever rotates by the predetermined angle.

Also, the lever may be prevented from being contaminated by the water discharged from the water discharge nozzle.

The contamination of the lever may be prevented to improve the sanitation and cleanliness of the user, thereby solving the health hazards of the user due to the improvement of the sanitation and cleanliness.

Also, the contamination of the front surface of the water purifier by the dispensed purified water may be prevented to improve the sanitation and cleanliness of the water purifier itself due to the improvement of the sanitation and cleanliness.

Thus, the reliability of the product by the user may be improved, and since the reliability of the product is improved, the usage satisfaction by use of the product may be improved.

The water purifier according to the embodiment may expect the following effects.

According to the embodiment, the periphery of the water discharge nozzle may be covered by the protection cap to reduce the possibility of occurrence of the contamination of the water discharge nozzle.

According to the embodiment, the user may always receive the clean water through a water discharge nozzle that is sanitary.

According to the embodiment, the user may recognize the position of the water dispensing nozzle in the state in which the water discharge nozzle is covered by the protection cap.

According to the embodiment, the protection cap may be easily cleaned because the protection cap covering the water discharge nozzle is easily detachable.

According to the embodiment, the water discharge nozzle may not be opened even though the lever rotates at a predetermined angle, but the water discharge nozzle may be opened to dispense the water only when the user's water dispensing intention is clearly transmitted even if the lever rotates by the predetermined angle.

According to the embodiment, when the lever rotates forward, the water discharge nozzle may be covered before the lever reaches the vertical lower side of the water discharge nozzle to end the dispensing of the water, and thus, the water discharged from the water discharge nozzle may not contact the lever to prevent the water from being splashed and sanitarily manage the lever.

According to the embodiment, the contamination of the lever may be prevented as described above to improve the sanitation and cleanliness of the user, thereby solving the health hazards of the user due to the improvement of the sanitation and cleanliness.

According to the embodiment, the contamination of the front surface of the water purifier by the dispensed purified water may be prevented to improve the sanitation and cleanliness of the water purifier itself due to the improvement of the sanitation and cleanliness.

According to the embodiment, the reliability of the product by the user may be improved, and the usage satisfaction by use of the product may increase due to the improvement of the reliability of the product.

All components may be coupled to one another to form a single body or to operate as a single body, but the present disclosure is not limited thereto. That is, one or more components are selectively coupled and operated within the scope of the present disclosure. The terms "comprising," "including," and "having," as used in the claims and specification herein, shall be considered as indicating an open group that may include other elements not specified.

Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present disclosure is to be considered illustrative, and not restrictive, and the technical spirit of the present disclosure is not limited to the foregoing embodiment.

Therefore, the scope of the present disclosure is defined not by the detailed description of the invention but by the appended claims, and all differences within the scope will be construed as being included in the present disclosure.

What is claimed is:

1. A water purifier comprising:
   a water purifier body comprising a housing and a filter provided in the housing to filter raw water introduced from outside of the water purifier; and a water discharge module, the water discharge module comprising:
- a water discharge nozzle disposed on a front surface of the water purifier body and configured to supply the water passing through the filter to the outside of the water purifier body,
- a case from which the water discharge nozzle is exposed at a lower end of the case, the case being coupled to the front surface of the water purifier body;
- a chamber provided in the case;
- an opening/closing unit provided partially inside the chamber and configured to selectively open and close an upper side of the water discharge nozzle; and
- a lever rotatably supported on the case and the chamber, provided outside the case, and interlocked with the opening/closing unit,
  - the lever being configured to rotate in a backward direction through a section, the section in which the lever rotates comprising:
    - a first rotation section in which the opening/closing unit is maintained in a state of covering the upper side of the water discharge nozzle, and
    - a second rotation section behind the first rotation section in which the opening/closing unit opens the upper side of the water discharge nozzle.

2. The water purifier according to claim 1, wherein the water discharge module further comprises a protection cap detachably coupled to the lower end of the case to cover at least a portion of the water discharge nozzle exposed to the outside of the case, and the protection cap has a container shape including an opened upper portion and a recess extending downward from the opened upper portion, and
- a water discharge hole defined in a bottom surface of the protection cap at a position corresponding to the water discharge nozzle when the protection cap is coupled to the lower end of the case.

3. The water purifier according to claim 2, wherein the protection cap is configured to be detached from and engaged with the lower end of the case by being slid forward and backward, respectively, relative to the case, and
- a through-groove being defined in a rear surface of the protection cap to provide clearance for the water discharge nozzle as the protection cap is slid forward and backward relative to the case.

4. The water purifier according to claim 2, wherein the water discharge module further comprises a lever configured to be rotatably connected to a portion of the water discharge module with at least a portion of the lever disposed below the water discharge nozzle and configured to rotate backward and forward to open and close the water discharge nozzle.

5. The water purifier according to claim 1, wherein the protection cap is made of a transparent or translucent material.

6. The water purifier according to claim 1, wherein the chamber comprises a water inflow hole through which the water passing through the filter is introduced and an accommodation part in which the water introduced through the water inflow hole is accommodated and the chamber having a lower end communicating with an opened upper side of the water discharge nozzle;
- the opening/closing unit being elevated above the water discharge nozzle; and
- the lever being rotated forward and backward below the water discharge nozzle to cause the opening/closing unit to ascend.

7. The water purifier according to claim 6, wherein the lever comprises:
- a pressing part disposed below the water discharge nozzle;
- a vertical part extending upward from each of both sides of the pressing part;
- a horizontal part extending from an end of the vertical part to the inside of the case; and
- a plate-shaped cam member disposed on an end of the horizontal part to convert a rotation motion of the lever generated by pressing and pulling on the horizontal part into a reciprocating motion of the opening/closing unit.

8. The water purifier according to claim 7, wherein a cushion member made of an elastic material is disposed on a lower end of the lever.

9. The water purifier according to claim 1, wherein a front cover defining the front surface of the housing has a lower portion that is recessed backward with respect to the water discharge module.

10. The water purifier according to claim 7, wherein a friction member made of an elastic material to prevent the pressing part from being slid is disposed on a front surface of the pressing part.

11. The water purifier according to claim 6, wherein the opening/closing unit comprises:
- an elevation cap disposed outside the chamber and elevated by the lever; and
- at least one opening/closing member disposed inside the chamber and connected to the elevation cap to selectively open and close the opened upper side of the water discharge nozzle while being elevated together with the elevation cap.

12. The water purifier according to claim 11, wherein the at least one opening/closing member comprises:
- a first opening/closing member directly connected to the elevation cap; and
- a second opening/closing member disposed below the first opening/closing member and having a lower end that selectively opens and closes the opened upper side of the water discharge nozzle,
- wherein a first compression spring is inserted between the first opening/closing member and the second opening/closing member.

13. The water purifier according to claim 12, wherein a hollow part is defined in the first opening/closing member, and
- an upper portion of the second opening/closing member is accommodated in the hollow part of the first opening/closing member.

14. The water purifier according to claim 13, wherein a long hole communicating with the hollow part is vertically defined in the first opening/closing member and closed at a lower end by a portion of the hollow part, and
- a protrusion disposed on an outer surface of the second opening/closing member is inserted into the long hole.

15. The water purifier according to claim 14, wherein the long hole has a length greater than that of the protrusion, and
- when the protrusion is hooked with the closed lower end of the long hole while the first opening/closing member ascends together with the elevation cap, the second opening/closing member ascends together with the first opening/closing member.

16. The water purifier according to claim 12, wherein an upper end of the first opening/closing member passes through a top surface of the chamber and is connected to the elevation cap, and a second compression spring is inserted between the first opening/closing member and the top surface of the inside of the chamber.

17. The water purifier according to claim 12, wherein, the second opening/closing member is maintained in a state of covering the upper side of the water discharge nozzle in the first rotation section while only the elevation cap and the first opening/closing member ascend; and the second opening/closing member opens the upper side of the water discharge nozzle in the second rotation section while the elevation cap, the first opening/closing member, and the second opening/closing member ascend.

18. The water purifier according to claim 6, wherein a purified water tank in which the water passing through the filter is stored is installed in an upper portion of the inside of the housing, and the purified water tank is connected to the chamber.

19. The water purifier according to claim 6, wherein the chamber comprises:

a body part having an opened upper side, one side in which a water inflow hole through which the water passing through the filter is introduced, and a lower side to which the water discharge nozzle is connected; and a plug part covering the opened upper side of the body part.

20. The water purifier according to claim 1, wherein at least one of a display unit displaying various information and an input unit receiving various information is disposed on a front surface of the case that is exposed to the outside of the housing.

* * * * *